March 10, 1970 — R. F. MALLINA — 3,499,234
INTELLIGENCE DATA CONVEYING SYSTEM
Filed Sept. 16, 1966 — 3 Sheets-Sheet 1
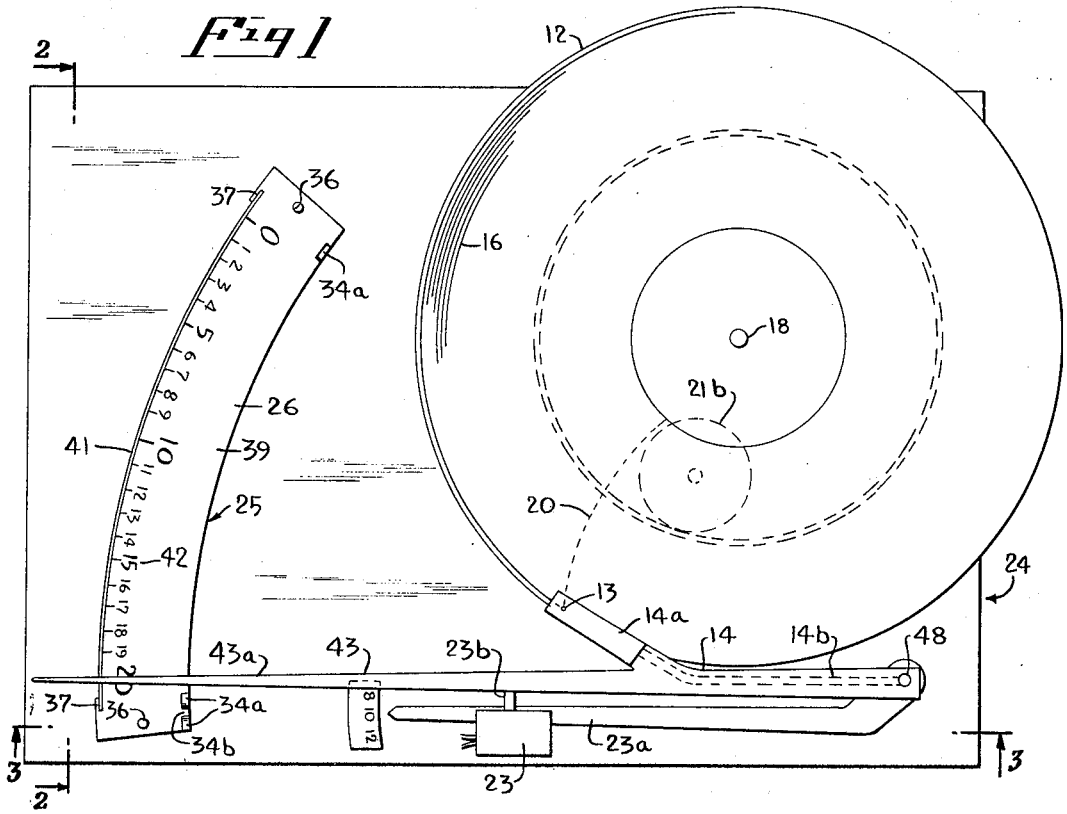
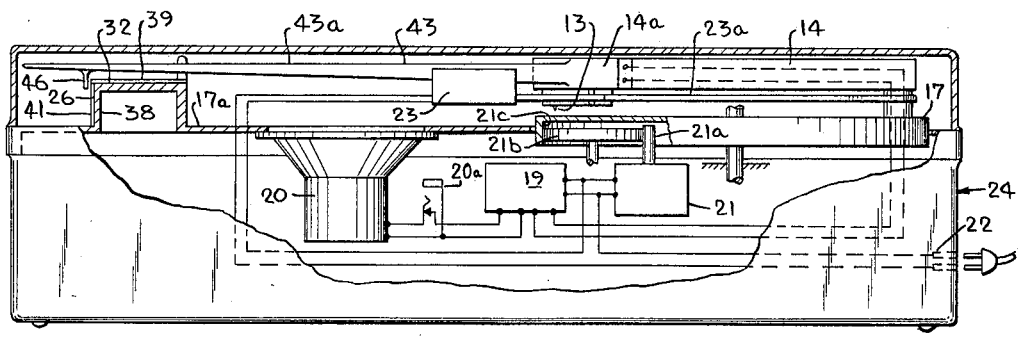
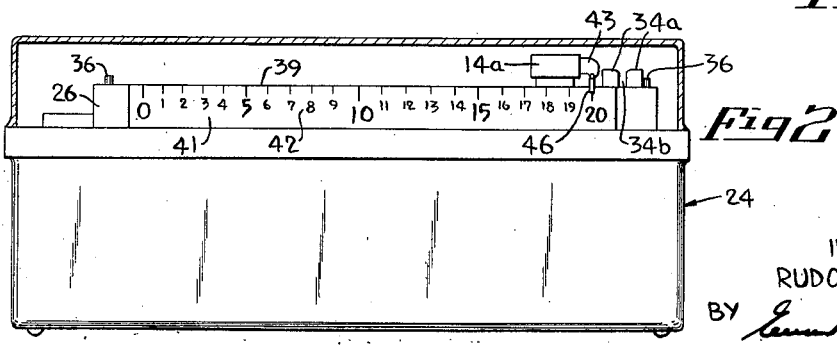
INVENTOR:
RUDOLPH F. MALLINA,
BY
HIS ATTORNEY.

March 10, 1970 R. F. MALLINA 3,499,234
INTELLIGENCE DATA CONVEYING SYSTEM
Filed Sept. 16, 1966 3 Sheets-Sheet 2

INVENTOR:
RUDOLPH F. MALLINA,
BY
HIS ATTORNEY.

March 10, 1970   R. F. MALLINA   3,499,234
INTELLIGENCE DATA CONVEYING SYSTEM
Filed Sept. 16, 1966   3 Sheets-Sheet 3
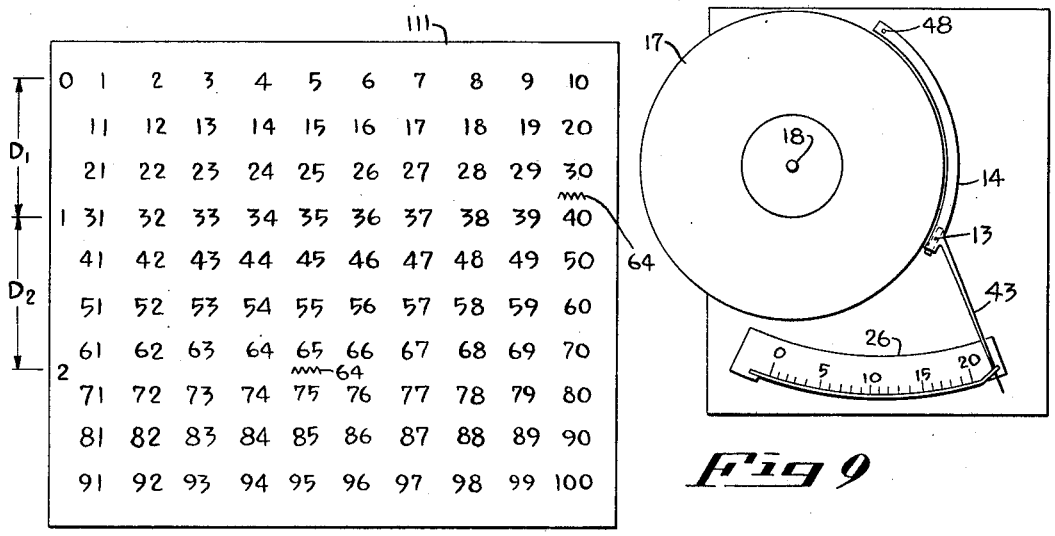
*Fig 8*
*Fig 9*
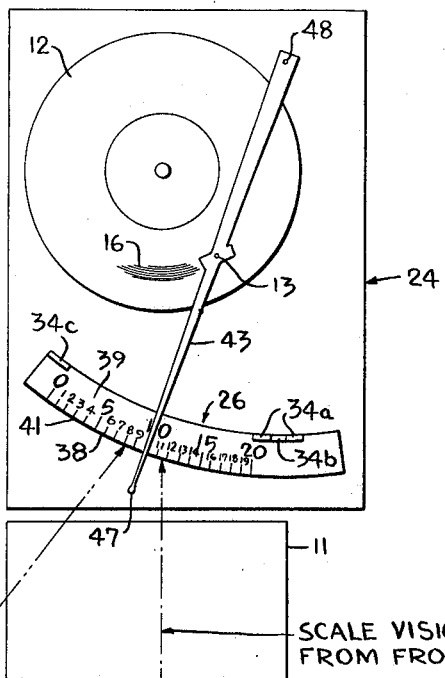
*Fig 10*
SCALE VISION FROM SIDE
SCALE VISION FROM FRONT
STUDENT ON SIDE
STUDENT IN FRONT
INVENTOR:
RUDOLPH F. MALLINA,
BY
HIS ATTORNEY.

3,499,234
INTELLIGENCE DATA CONVEYING SYSTEM
Rudolph F. Mallina, Hastings-on-Hudson, N.Y., assignor to Design for Learning, Inc., New York, N.Y., a corporation of New York
Filed Sept. 16, 1966, Ser. No. 579,967
Int. Cl. G09b 5/06
U.S. Cl. 35—8                                    11 Claims

ABSTRACT OF THE DISCLOSURE

An intelligence conveying system for a readable material and a record, has a turntable that turns the record, sensing means receiving data from the record and conveying them into audible signals, and an indicator indicating coordinate positions on the record as sensed and on the readable material.

---

The invention relates to a system for conveying to a person intellignce data simultaneously, audibly and non-audibly, and relates more particularly to audio-visual teaching devices. Still more particularly, the invention relates to teaching devices of the type wherein the student simultaneously reads and hears a message. The messages referred to need not be restricted to linguistics but could include mathematical formulae, programs of various types such as instructions on doing something rather than reading something, or the like. The terms "hearing" as well as similar words relating to audio signals are not intended to be restricted to hearing by air waves, but include all manner of hearing comprising electronically or otherwise vibrations conveying the sensation of hearing to a person.

Similarly, the expression "reading" is intended not to be restricted to the visual type, but may include the absorption of information by tactile sensation, such as "reading" Braille impressions.

The audio-visual method of education has been in use since the invention of the phonograph. It began with the Edison cylinder record. Later Berliner invented the disk record. The disk is much more economic in cost, is easier to store and to load and has immediate access facilities. After mechanical and grooved records photographic and magnetic records were developed, then followed the sound film and tape. All of these systems have been used in education to a lesser or greater degree. None approaches the book in the speed of scanning for locating a particular portion of the record. To locate a certain paragraph of a book all one has to do is scan the index and locate the numbered page. With a film or tape record, both of which are linear devices, this quick access is not possible. It means constant winding and rewinding before a specific portion can be located.

With the disk record quick access is obtained easier. The tone arm of the record player is simply lifted and shifted to another part of the record. The conventional way in which a portion of the record is located is the so-called band-system. The record area is divided into bands and the label on the record specifies the content of the bands. Foreign language records, for example, make each band a lesson. Some bands may be narrow, some are quite wide. If there are, for example, four bands on the record one might express the accuracy of location as one band out of four. This means that one is able to locate only the beginning of a lesson. Even that is difficult because the stylus is underneath the tone arm and one cannot see where it engages the groove. Another drawback with the band method is the fact that the beginning of the bands on a rotating record is difficult to see from the student's position.

It is accordingly among the principal objects of the invention to provide a system of the type referred to which avoids the pitfalls and difficulties of the prior art.

It is another object of the invention to provide for the coordination or synchronization of two means of conveying the same intelligence data simultaneously in a continuous, uninterrupted spectrum.

It is a further object of the invention to provide for the use of a record rotating on a turntable and means by which a desired part of the record can be located with greater precision than was hitherto possible and also to provide means by which the desired portion of the record can be coordinated with the same portion of intelligence data on another medium.

It is still another object of the invention to provide for a device of this type which is simple to operate by the student while seated It is yet a further object of the invention to provide a device of this type which has a coordinating indicator to be operated by the student and which, when operated by the student, will automatically start and stop the device.

It is still another object of the invention to provide for coordinating means that include a scale readable from the top and from one side, with indicating means pointing to the top and side portions of the scale simultaneously.

It is still another object of the invention to give the student a time indication from one part of the record to another part.

Another object of the invention is to introduce the student to the learning of scale reading (scale reading from left to right).

Still another object of the invention is to cut off the power source of the machine automatically when the end of the record at the outer rim has been reached.

Further objects and advantages of the invention will be set forth in part in the following specification and in part will be obvious therefrom without being specifically referred to, the same being realized and attained as pointed out in the claims hereof.

For a fuller understanding of the nature and objects of the invention, reference should be had to the following detailed description, taken in connection with the accompanying drawings, in which:

FIG. 1 is a plan view of an apparatus for the system referred to, the cover having been removed to reveal the parts of the machine visible from the top;

FIG. 2 is an end elevational view thereof, partly in section taken on the line 2—2 of FIG. 1;

FIG. 3 is a side elevational view thereof, partly in section taken on the line 3—3 of FIG. 1;

FIG. 8 is a plan view of a printed or otherwise written surface produced by the machine shown in FIG. 7;

FIG. 9 is a plan view similar to FIG. 1, but embodying a modification; and

FIG. 10 shows the relative locations of machine, program and student.

Figure 4:
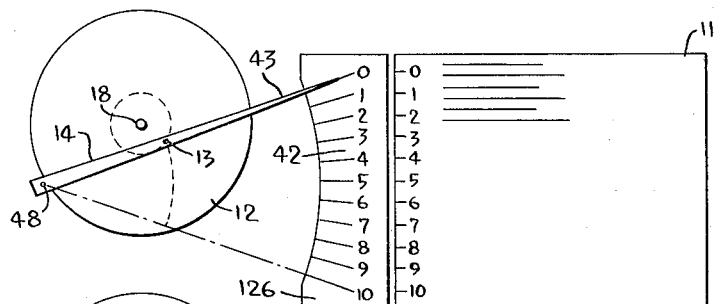
FIG. 4 is a schematic plan view, similar to FIG. 1, but embodying a modification.

In carrying the invention into effect in the embodiments which have been selected for illustration in the accompanying drawings and for description in this specification, and referring now particularly to FIGS. 1–5, there is provided a system conveying to a person intelligence data simultaneously to be heard and read by that person.

As previously explained, the terms "heard" and "read" are used in a broad and not in any restrictive sense. The system provides for a first carrier 11 (FIG. 5) bearing the intelligence data in readable form; for instance, a book or sheet or text of written or printed matter, such as a passage, or vocabulary, in a foreign language, which is to be read by the person such as the foreign language student, operating the system. A second carrier 12 (FIGS. 1–4) is provided to convey simultaneously an audible signal to the person while the person reads the text 11. The second carrier 12 may, for instance, be a spirally grooved phonograph record that is played on a phonograph device 24.

In accordance with a preferred embodiment, the spirally grooved record is so arranged that the spiral proceeds from the inside radius towards the outside radius so that the stylus 13 of the pick-up or tone arm 14 when it engages the groove 16 of the phonograph record will be moved outwardly.

The second carrier 12 is supported on a turntable 17 of well-known conventional construction that forms a part of the photograph device 24. The stylus 13 and pick-up 14 form a part of coordinating means 25. They receive from the second carrier 12 the intelligence data recorded thereon and move continuously relative to the turntable 17 in a plane that is disposed at right angles to the axis of rotation 18 of the turntable 17. Means are provided of conventional well-known construction, only partially shown in detail in the drawing and explained broadly below, to complete the phonograph device 24, such as an electric circuit including an amplifier 19 that may or may not be transistorized, and a loud speaker 20 and earphones 20a.

The turntable 17 is driven by a motor 21 that has means, such as electric wires 22 for connection to an electric source or power supply. Switch means such as a micro switch 23 may be provided, in accordance with a preferred embodiment, for starting and stopping the operation of the turntable 17. The switch means 23 may be on the outside, as shown in FIGS. 1 and 3, and be electrically connected to the motor 21 as shown, or it may be hidden from the view below the top plate or turntable board 17a of the phonograph device 24. The switch is mounted on a lever 23a so that it can be set to work with records having various diameters, for example 8 in., 10 in. and 12 in.

The tone arm 14, in accordance with a preferred embodiment, may be curved as shown in FIG. 9, so as to indicate automatically, even to an inexperienced student, how the record can be placed concentrically on the turntable pin that is coaxial with the axis 18.

The motor 21 has a motor shaft or spindle 21a that drives an idler wheel 21b that, in turn, drives the turntable 17 by engaging the rim 21c of the turntable 17 that depends therefrom. The cartridge head 14a of the pick-up 14 is detachable. Leads 14b (FIG. 1) are provided in the pick-up 14 to receive electrical impulses generated due to the movements of the stylus 13.

Figure 6:
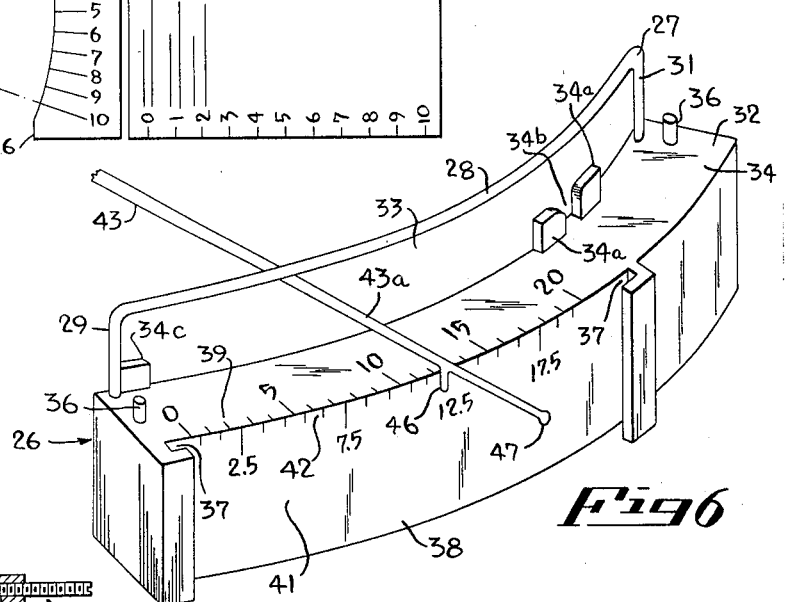
FIG. 6 is a fragmentary perspective view of a part shown in FIG. 1.

The coordinating means 25 operates for coordinating the dual conveying to the person using the system of the intelligence data simultaneously from the audible record and from the visual or readable record. The coordinating means 25 comprise a support 26 that is purposefully raised with relation to the turntable board 17a. The support 26, as best shown in FIG. 6, carries a guard 27 that includes an upper protective rail 28 and side portions 29 and 31, that define with the top surface 32 of the support 26 a passage 33. The support 26 furthermore carries at its upper surface 34, a means, such as two pins 36 and slots 37, for mounting releasably on the top 32 and on the external side surface 38, removable top and bottom members 39 and 41, respectively. These members 39 and 41 display a series of symbols such as, for instance, a scale 42. The top and bottom members 39 and 41 are usually extremely thin, being made of thin paper or other thin layer, so that they together in edgewise abutment complete the scale 42. The scale may instead form part of the support 26.

An indicator or pointer or tone arm extension 43 on the tone arm 14 may be moulded for instance, of plastic or the like, in one piece with the pick-up 14. The tone arm extension 43, as best shown in FIG. 6, has a horizontal portion 43a that gives indication of the horizontal part of the scale that is formed on the member 39; and the indicator 43 has also a vertical portion 46 that indicates the vertical scale part on the member 14. Furthermore, the tone arm extension 43, in accordance with a preferred embodiment, has a tip 47 that extends beyond the external side 38 of the support 26. The projecting tip 47 and also the portion 43a of the tone arm extension 43 offers the advantage of easy lifting by the person using the phonograph device 24 to move the tone arm extension 43 by first lifting it, then moving it about its pivot 48 and thereafter again lowering it, thereby moving the stylus 13 to engage a different portion of the groove 16.

The support 26 furthermore carries near one end at its upper surface 34 two ridges 34a that are spaced apart from each other defining therebetween a hollow space 34b wherein there will be engaged, in its rest position, the portion 43a of the tone arm extension 43. A zero stop 34c is provided near the other end of the support 26 (FIG. 1). Preferably, the indicator 43 along with the pick-up 14 are biased towards one position.

Figure 5:
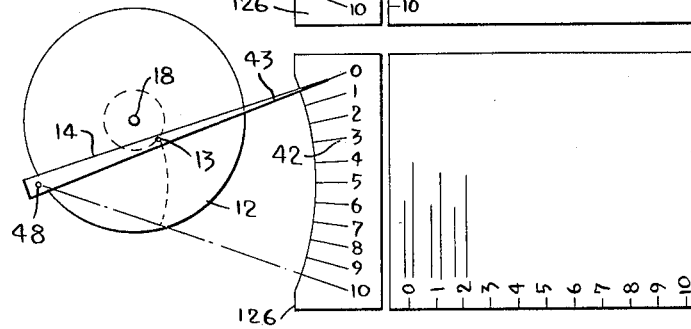
FIG. 5 is a schematic plan view similar to FIG. 4, but embodying a further modification.

The series of numbers of the scale 42 find their counterpart in the group of numbers of the text of the reading matter, such as the book or printed or written sheet 11 (FIGS. 4 and 5). As shown in FIG. 4, the coordination may be a direct one, namely the series of numbers of the scale 42 being drawn on a predetermined line which, in FIG. 4 in contrast to FIG. 6, is a straight line, though it could, if desired, also be an arched line. The same numbers of the group are lined along a similar line on the sheet 11, so that the two lines match each other, and the distances between the individual numbers of the scale also match each other. Thus, when the tone arm extension 43 points to the number 0, the stylus will be in its initial position, and the tone arm extension 43 points also at the zero number of the book or sheet 11. Thus, the person will know that the setting is at the beginning of the conveyance of both methods of intelligence transmission; for instance at the beginning of the lesson.

In accordance with a preferred embodiment, as previously stated, the groove is spiraled outwardly. Thus, as shown in FIG. 4, as the lesson progresses, and the record 12 turns, the indicator 43 will progressingly point at the number 1 of the scale 42, then at the number 2, then 3, etc.; the pointer 43 will progress continuously, and thus the stylus 13 will continuously convey the audible message, while the pointer 43 will continuously move to point to that portion of the text in the book 11 that conforms substantially to that being heard.

Instead of using a scale, particularly for the teaching of children who have not yet learned the reading of numbers, the numerical scale 42 as well as the markings on the paper 11 may be replaced by other symbols such as, for instance, fields in different colors, or pictures of animated and/or inanimate objects, such as fruit, animals, or the like (not shown in the drawing) for providing coordination between that which is being heard, and that which is being seen on the paper 11, by the child as the record plays and the indicator moves as driven by the stylus 13 in the groove 16.

As shown in FIGS. 1 and 5, however, it is not necessary to line up the group of numbers or other symbols of the book with the series of numbers or symbols displayed on the support 26 (FIG. 1; 126 in FIGS. 4 and 5). The tone arm extension 43 with its horizontal portion 43a and vertical portion 46 in all the embodiments will point to the series of symbols such as the numerical scale 42, but the respective group of symbols of the book or paper 11, can be searched out by the person on the paper or book 11 itself, even if the book or paper 11 is not lined up as in FIG. 4. Thus, the series of symbols, such as the numerical scale 42, which is found in the identical sequence on the numbers 39 and 41 as well as in form of a group of symbols on the first carrier, namely the book or paper 11, aid the person in coordinating the audible message with the message read.

The indicator portions 43a and 46, together with the support 26 and the numbers on 39 and 41 thereon provide an automatic coordination between that portion of the message that is being picked up by the stylus 13 from the groove 16, and the particular symbol pointed to by the indicator portions 43a and 46.

As shown in FIG. 1, the support 26, in accordance with a preferred embodiment, is positioned peripherally about the pivot 48 of the tone arm 14 that carries the tone arm extension 43, so that the external side 38 of the support 26 forms a portion of a cylinder mantle; instead of an arched support 26, however, the support may, at least in part at the external side, be straight as indicated at 126 in FIGS. 4 and 5.

The main reason for having the groove 16 spiral outwardly, is to make the scale, as shown in FIGS. 1 and 2, read from left to right. This is advantageous, because most students are used, or are supposed to learn to read in sequence from left to right. It will be understood, however, that this is not a necessary restriction, and that if desired, the record 12 may have a groove that spirals inwardly, and the direction of the scale 42 may be reversed to read from right to left.

In arranging for the coordination between the two modes of intelligence data transmission referred to hereinabove, it must be borne in mind that there are several variables possible in this system. For instance, the text of the book 11 may be printed in larger letters or smaller letters, and thereby one may arrive at synchronism with a given arcuate speed of the indicator or tone arm extension 43 as it is driven by the stylus 13 from the groove 16. Another coordination variant is the pitch of the grooves 16 used. Other means of variations may readily appear to the skilled artisan.

The scale may be in the form of a truncated cone rather than in two parts of a cylinder.

The stylus 13 is a part of the pick-up 14; the head 14a is detachable. The scale 42 may have graduations that coincide with time elements coordinated with the rotational speed of the record 12 and the speed of movement of the stylus 13 along its peripheral path 20 across the record 12; thus the scale 42 can be calibrated in minutes and fractions thereof, as shown in FIG. 9.

As best shown in FIG. 1, the support 26 is arranged non-symmetrically laterally off-set with respect to the width of the phonograph device 24. The support 26 may, however, if desired, be arranged symmetrically, as shown in FIG. 9.

The operation of the above described embodiments is as follows:

The operator, such as the student of, for instance, a foreign language program, will put the proper record 12, for instance a record that has grooves 16 that spiral outwardly, onto the turntable 17. He will then place the series of symbols, such as for instance the scale 42, by means of the members 39 and 41 into the respective places on top and at the external side of the support 26, by means of the aid of the pins 36 and the slots 37, respectively. The student, furthermore, will select that sheet 11 that pertains to the same lesson as the record he just put onto the turntable 17.

Let us assume now that during the previous study period he has proceeded until a certain location in the text 11, for instance near the number 5 of the scale of the paper 11. He will thereupon lift from below the tip 47 from its rest position in the space 34b between the ridges 34a, lift it over one ridge 34a, and move it opposite the number 5 on the scale 42 on the support 26. At that point, he will lower the tip 47 until the stylus 13 engages the record 12. When the stylus 13 engages the groove 16, it will be substantially at the position of the audible lesson that he desires to follow at the aforesaid location in the printed text 11. With the movement of the tip 47, there will, of course, also be moved the tone arm extension 43 and the pick-up 14 together with the stylus 13, the latter being moved along the path 20, though above the record 12. As the student moves the tone arm extension 43 away from the plunger 23b of the micro switch 23, the motor 21 will start to turn the turntable 17 at the same time the transistorized amplifier will be cut in. As the lesson progresses from number 5 of the scale 42 onwards, the stylus 13 will be pushed by the groove 16 in its path 20, outwards, and consequently the indicator portions 43a and 46 will pass past the numbers 6, 7, 8, 9 and reach the end of the scale at the number 20 or slightly thereafter; this coincides substantially with the end of the spoken lesson of the record 12. At that instant, the indicator 43 will engage the plunger 23b of the switch 23 thereby stopping the motor 21 and de-energizing the amplifier; the rotation of the turntable 17 will thus come to a halt. The student will now lift again the tip 47, and put it to the right of the ridge 43a, into its rest position.

The indicator 43 projects in all positions through the passage 33 that is formed by the guard 27 above the top surface 32 of the support 26.

As previously explained, the series of symbols mounted on the support 26 is matched in sequence by the group of symbols on the book or sheet 11; in accordance with the preferred embodiment, these symbols are the consecutive numbers of a scale representing time periods.

As best shown in FIG. 10, the student may sit in front opposite the short side of the device 24, or to the left of it, and in both instances he will be able at least to read that part of the scale that is displayed on the external surface 38 of the support 26, for instance by the member 41; he may also, when properly positioned relative to the support 26, see the top scale as displayed by the member 39. The advantage of two scales (horizontal and vertical) is the fact that twice as many division lines and numbers can be accommodated in the same area; for example, even numbers on the vertical scale and odd numbers on the horizontal scale.

As previously noted, not only the groove 16 is continuous, but its recordings, such as impressions, are also continuous so that the record 12 is not necessarily divided into bands; but the text continues substantially throughout the groove 16. Thus, wherever the stylus 13 is moved to a new location on the groove 16, for instance by moving the pointer 46 with the aid of the tip 47, the audio reception will be immediate. In accordance with a preferred embodiment, the support 26 is so positioned from the pivot 48, that the distance between the support 26 and the pivot 48 as compared to the distance between the stylus 13 and the pivot 48, is magnified by a factor from about 1.5 to about 2.5. The external side surface 38, in accordance with the preferred embodiment, forms a portion of a cylindrical mantle. The scales, or other series of symbols, are exchangeable. The raised position of the top 32 of the support 26 has the advantage that the tip 47 may easily be grasped and lifted from below.

In addition to the foregoing, the coordinating means may include peep tones, or number calling, or the like recorded periodically in the record 12. Thus, if between the lesson wordings the record announces audibly numbers 8, 9, 10, etc., the student knows exactly where to look in the text. The announcement can be by pronouncing the numbers, or by dot-signals or other predetermined special tone signals.

Figure 7:
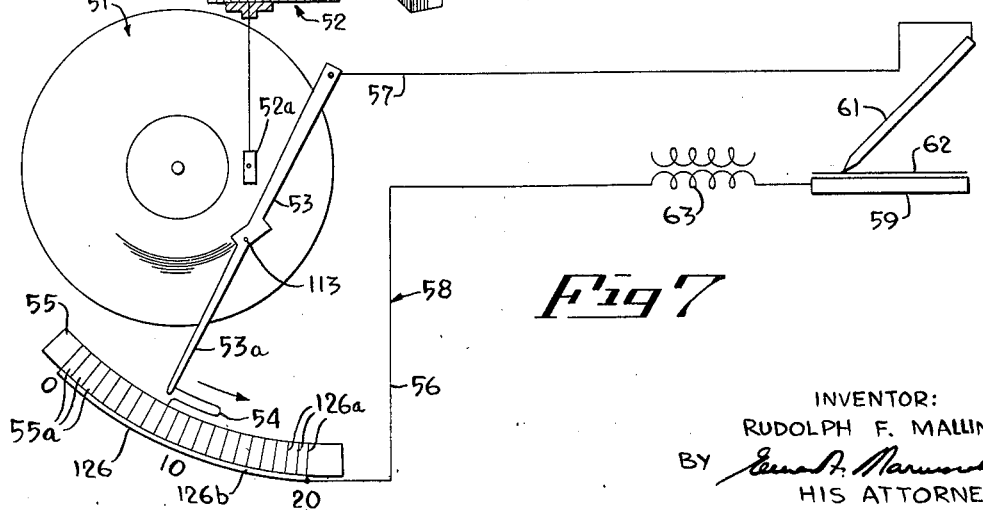
FIG. 7 is a schematic view of a machine for cutting a grooved record, and preparing a text with scale symbols for use in one embodiment of the invention.

The coordination between the messages in audible and in readable form, may take on an automatic form if produced in accordance with the apparatus shown in FIGS. 7 and 8. Assuming that a text, for instance in a foerign language, is to be read by an actor into the phonograph record, a disk recording machine 51 is provided, of conventional design. It includes a lead screw 52 that feeds the recording head 52a either from the outside in or from the inside out.

A tone arm 53 is provided that has a stylus 113 of a reproducing head which follows the groove. The tone arm 53 has an extension 53a which carries a contact spring 54. An arcuate support 126 is provided that has metal laminations 126a that are mounted on and electrically connected to a metal base 126b and an insulator 55 with insulator portions 55. Each lamination 126a is disposed between two insulator portions 55a and corresponds to one phonograph record groove, and all laminations 126a are connected by leads 56 and 57 in a spark coil circuit 58. One lead 56 leads to a metal plate 59, and the other to a metal pencil or pointer 61. If a paper 62 is interposed between the metal plate 59 and the pointer 61, and the coil 63 of the circuit 58 is energized, a mark will burn into the paper 62.

The laminations 126a and the contact spring 54 preferably are made of silver or gold. The spring force will need to be weak so that the stylus may still track in the shallow record groove.

The person, for instance the actor, who reads the text from the paper 62 and speaks into a microphone, will follow the words on the paper 62 with the pointed 61. The point of the pointer 61, keeping contact on the paper 62, then marks a short spark line 64 every time the contact spring 54 makes contact with a metal lamination 126a, and the circuit 58 will be closed. If in FIG 8, the words from the numeral 1 to the numeral 30 are read, the spark line 64 begins at the numeral 30, and the number (1) of the scale would later be entered in front of the line that begins with the numeral 31. If the next spark line 64 begins at the numeral 65, the scale number (2) would be entered between the lines that begin with the numerals 61 and 71. In this way, the student can during play-back later on determine with a greater degree of accuracy where the stylus 13 enters the groove 16. The program shown in FIG. 8 corresponds to the paper 11 shown in FIGS 4–5, and is designated 111.

The spaces D (FIG. 8) between the scale numbers (1), (2), (3), etc. of the text on the sheet 11 are indicated at $D_1$, $D_2$, etc. The lines of the text need not have the same lengths. Further variables are the reading speed with which the text is recorded on the record, the pitch of the record groove 16, and the distance between the lines of the text on the sheet 111 at right anlges to the lines of the text. The lines may be typed, or raised for Braille, or may be written or printed in any other way. In contrast to these variables, there are the constants of the rotational speed of the turntable and the divisions of the scales on the support 26.

The variables have the following relations: The longer the line length, the smaller the spaces D; the larger the distances between the lines of the text, the larger will be the spaces D; the larger the record pitch, the smaller will be the spaces D; and, lastly, the greater the reading speed, the smaller will be the spaces D.

The spaces D represent only an approximation, as an exact correspondence between the written and recorded text may put the exact scale divisions within the lines of the written text. For the sake of uniformity, however, the scale division of each line is placed at the same margin, so that it may facilitate the coordination with the scale on the support 26.

I wish it to be understood that I do not desire to be limited to the exact details of construction shown and described, for obvious modifications will occur to a person skilled in the art.

Having thus described the invention, what I claim as new and desire to be secured by Letters Patent, is as follows.

I claim:
1. In a system for conveying to a person intelligence data simultaneously audibly and non-audibly, for use in connection with a first carrier bearing said intelligence data in readable form and a second rotatable carrier bearing substantially the same intelligence data and being adapted to have the intelligence data conveyed to a person's hearing, the combination of:
   a revoluble turntable adapted to support and to rotate said second carrier,
   sensing means including a device continuously movable relative to said turntable in a plane disposed at right angles to the axis of rotation of said turntable and operable to receive from said second carrier the intelligence data and to convert them into signals adapted to be heard by the person,
   and coordinating means mounted with relation to said turntable and including a support comprising:
      means establishing a surface mounted outside the periphery of said turntable displaying a series of successive symbols, each symbol relating to a portion of said intelligence data, said coordinating means further including an indicator in driven conection with said device and thereby continuously moving in response to the movement of said device and traversing said surface and positioned closely adjacent and parallel to said surface, though free from contact with said support for visually indicating respective symbols in the series corresponding to the intelligence data portions the sensing device receives from said second carrier, said indicator including an extension projecting beyond said support for easy manual lifting of said indicator,
      said first carrier comprising a group of said symbols in the same sequence as said series,
      each symbol of said first carrier being coordinated with substantially the same portion of the intelligence data of said first carrier sensed by said sensing device on said second carrier when said indicator points to the symbol of said series.

2. In a system for conveying to a person intelligence data simultaneously audibly and non-audibly, for use in connection with a first carrier bearing said intelligence data in readable form and a second rotatable carrier bearing substantially the same intelligence data and being adapted to have the intelligence data conveyed to a person's hearing, the combination of:
   a revoluble turntable adapted to support and to rotate said second carrier,
   sensing means including a device continuously movable relative to said turntable in a plane disposed at right angles to the axis of rotation of said turntable and operable to receive from said second carrier the intelligence data and to convert them into signals adapted to be heard by the person,
   and coordinating means mounted with relation to said turntable and including a support comprising:
      means mounted outside the periphery of said turntable displaying a series of successive symbols, each symbol relating to a portion of said intelligence data, said coordinating means further including an indicator in driven connection with said device and thereby continuously moving in response to the movement of said device and extending to a position closely adjacent said support for visually indicating respective symbols in the series corresponding to the intelligence data portions the sensing device receives from said second carrier, and including an extension projecting beyond said support for easy manual lifting of said indicator.

said first carrier comprising a group of said symbols in the same sequence as said series, each symbol of said first carrier being coordinated with substantially the same portion of the intelligence data of said first carrier sensed by said sensing device on said second carrier when said indicator points to the symbol of said series, said indicator moving about a pivot, said support being arcuate and concentric with said pivot and having a top and a side external with respect to the axis of rotation of said turntable, said displaying means including a first symbol carrying member disposed near said top and a second symbol carrying member disposed near said external side, the symbols of said two members completing said series, said indicator having a first portion adjacent said top and a second portion adjacent said external side, thereby pointing at both members simultaneously, and said extension forming a third portion projecting beyond said external side.

3. In a system, as claimed in claim 2, means formed on said support operable for releasably mounting exchangeably each of said members on said support, said first symbol carrying member being mounted above said plane of said turntable, said indicator including an extension, protruding beyond said second member, for manual lifting.

4. In a system, as claimed in claim 1, said device and indicator being biased towards a position near one end of said support.

5. In a system, as claimed in claim 1, said support having a top and comprising a guard including a protective bar extending for a portion near said top to a height above said top defining an elongated passage through which said indicator projects, thereby confining the indicator to preclude accidental movement thereof beyond a predetermined space above and alongside said portion of said support.

6. In a system, as claimed in claim 1, said series of symbols being spaced apart from each other along a predetermined line, said group of symbols following a line matching that of said series of symbols and matching the distances between the respective symbols thereon, said first carrier being positionable adjacent said support and having in that position each symbol substantially in register with the respective symbol of said series, whereby said indicating means will simultaneously indicate during its movement the corresponding symbols of said series and of said group.

7. A system for conveying to a person intelligence data simultaneously audibly and readably comprising:

a first carrier bearing said intelligence data in readable form, and a second carrier including a spirally grooved rotatable phonograph record bearing substantially the same intelligence data, a revoluble turntable supporting and rotating said phonograph record, sensing means including a pick-up device having a stylus movable in said groove relative to said turntable in a plane disposed at right angles to the axis of rotation of said turntable and operable to receive from said phonograph record the intelligence data and to convert them into audible signals, and coordinating means mounted with relation to said turntable and including two scale members, an arcuate support comprising:

means mounted outside the periphery of said turntable and mounting said two scale members one on top of the support and one on the external arcuate side, said members completing together a numbered scale positioned on said support peripherally about the pivot point of said pick-up at such a distance that it magnifies the path of the stylus across the spiral grooves at a ratio of about 1.5 to about 2.5, said top member being in a plane parallel to and above the turntable, said side member forming a portion of a cylinder mantle, said coordinating means further including an indicator mounted on said pick-up and forming an extension thereon projecting beyond said support and scale and being continuously movable in response to the movement of said pick-up and including a portion closely adjacent said scale for visually indicating a respective number on said scale corresponding to the intelligence data portion the pick-up receives from said groove, said first carrier comprises numbers corresponding to said scale in the numerical scale sequence, each number of said first carrier corresponding substantially to the same portion of the intelligence data of sadi first carrier sensed by said pick-up on said phonograph record when said indicator points to the respective number of the scale.

8. A system, as claimed in claim 7, said scale members being exchangeable, and scale member mounting means mounting said scale members on the support releasably.

9. In a system, as claimed in claim 7, said coordinating means further comprising said phonograph record including at predetermined intervals predetermined tone signals producing impressions coordinated with said numbers, whereby when the pick-up receives a predetermined tone signal the indicator will point to the respective number on the scale.

10. In a machine for coordinating audio signals with readable signals, a rotatable recording table, means including a lead screw and a recording head operable for cutting a spiral groove in a record on said recording table energized by audio signals, for subsequent audio reproduction, a tone arm including a stylus riding in said groove, and an extension of said tone arm, an arcuate support for a series of metal laminations each being insulated and spaced apart from the adjoining laminations at equal distances, said extension of said tone arm comprising a contact engaging successive among said laminations as the recording progresses, said laminations, extension and contact forming a part of an electric circuit including a source and a metal plate and pointer having a metal point, whereby a paper put on said metal plate and containing in readable form the text recorded for audio reproduction by a person reading said text for recording it with said recording head in said groove and following with said pointer the text on said paper while engaging said paper and pressing it therewith against said metal plate, a spark mark will be made in said text by the pointer each time when said contact engages a lamination.

11. In a system for conveying to a person intelligence data simultaneously audibly and non-audibly, for use in connection with a first carrier bearing said intelligence data in readable form and a second rotatable carrier bearing substantially the same intelligence data and being adapted to have the intelligence data conveyed to a person's hearing, the combination of:

a revoluble turntable adapted to support and to rotate said second carrier, sensing means including a device continuously movable relative to said turntable in a plane disposed at right angles to the axis of rotation of said turntable and operable to receive from said second carrier the intelligence data and to convert them into signals adapted to be heard by the person, and coordinating means mounted with relation to said turntable and including a support comprising:

means displaying a series of successive symbols, each symbol relating to a portion of said intelligence data, said coordinating means further including an indicator in driven connection with said device and thereby continuously moving in response to the movement of said device and extending to said support indicating respective symbols in the series corresponding to the intelligence data portions the sensing device receives from said second carrier, said first carrier comprising a group of said symbols in the same sequence as said series, each symbol of said first carrier being coordinated with substantially the same portion of the intelligence data of said first carrier sensed by said sensing device on said second carrier when said indicator points to the symbol of said series, said second carrier including a phonograph record having a spiral groove guiding the stylus outwardly when the turntable rotates, and switch means in the path of said indicator operable by the indicator for starting and, respectively, stopping the rotation of said turntable.

References Cited

UNITED STATES PATENTS

| | | | |
|---|---|---|---|
| 1,320,639 | 11/1919 | Mott | 274—42 |
| 2,082,261 | 6/1937 | Runyan | 35—35.3 |
| 2,141,804 | 12/1938 | Thompson et al. | 274—15 |
| 2,307,259 | 1/1943 | Fling | 274—14 |
| 2,325,708 | 8/1943 | Runge | 274—14 |
| 2,443,745 | 6/1948 | Montgomery | 116—136.5 |
| 2,597,939 | 5/1952 | Lamb | 116—136.5 |
| 2,610,062 | 9/1952 | Bratton | 274—42 |
| 2,919,923 | 1/1960 | Blain | 274—15 |
| 2,977,125 | 3/1961 | Mallina | 274—14 |
| 3,183,004 | 5/1965 | Miessner | 274—14 |

EUGENE R. CAPOZIO, Primary Examiner

WALTER W. NIELSEN, Assistant Examiner

U.S. Cl. X.R.

274—46